United States Patent
Lu et al.

(10) Patent No.: US 8,413,043 B2
(45) Date of Patent: *Apr. 2, 2013

(54) APPARATUS AND METHOD FOR WEB FORWARDING

(75) Inventors: Chun-Ming Lu, Sterling, VA (US);
Vincent M. Lee, Ashburn, VA (US)

(73) Assignee: Network Solutions Inc., Herndon, VA (US)

( * ) Notice: Subject to any disclaimer, the term of this patent is extended or adjusted under 35 U.S.C. 154(b) by 611 days.

This patent is subject to a terminal disclaimer.

(21) Appl. No.: 12/267,016

(22) Filed: Nov. 7, 2008

(65) Prior Publication Data

US 2009/0094379 A1    Apr. 9, 2009

Related U.S. Application Data

(63) Continuation of application No. 09/500,639, filed on Feb. 9, 2000, now Pat. No. 7,461,334.

(60) Provisional application No. 60/125,107, filed on Mar. 19, 1999.

(51) Int. Cl.
*G06N 3/00* (2006.01)
(52) U.S. Cl. .................................................... 715/234
(58) Field of Classification Search ............... 715/234, 715/243, 254; 712/234, 243, 254
See application file for complete search history.

(56) References Cited

U.S. PATENT DOCUMENTS

| 5,572,643 A | 11/1996 | Judson |
| 5,640,193 A | 6/1997 | Wellner |
| 5,751,956 A * | 5/1998 | Kirsch ............................ 709/203 |
| 5,812,769 A | 9/1998 | Graber et al. |
| 5,909,686 A | 6/1999 | Muller et al. |
| 5,933,827 A | 8/1999 | Cole et al. |
| 5,995,099 A | 11/1999 | Horstmann |
| 6,041,360 A * | 3/2000 | Himmel et al. ............... 709/245 |
| 6,052,736 A | 4/2000 | Ogle et al. |
| 6,128,279 A | 10/2000 | O'Neil et al. |
| 6,282,542 B1 | 8/2001 | Carneal et al. |
| 6,321,242 B1 | 11/2001 | Fogg et al. |
| 2002/0016789 A1 * | 2/2002 | Ong ................................ 707/10 |

OTHER PUBLICATIONS

Apache HTTP Server, "Apache 1.3 URL Rewriting Guide", Dec. 1997. p. 1-24, http://httpd.apache.org/docs/1.3/misc/rewriteguide.html.
Apache HTTP Server, "Module mod_rewrite URL Rewriting Engine", http:httpd.apache.org/docs/1.3/mod/mod_rewrite.html (last visited Oct. 2, 2009).

* cited by examiner

*Primary Examiner* — Kyle Stork
(74) *Attorney, Agent, or Firm* — Morris & Kamlay LLP

(57) ABSTRACT

An apparatus and method for forwarding a web address to another web address is presented. A web forwarder receives a request destined to a first web address including at least a domain name. The web forwarder then determines a forwarding uniform resource locator (URL) that corresponds to the domain name and redirects the request to a second web address that corresponds to the forwarding URL.

13 Claims, 7 Drawing Sheets

APPARATUS AND METHOD FOR WEB FORWARDING

RELATED APPLICATIONS

This application is a continuation of U.S. application Ser. No. 09/500,639, filed Feb. 9, 2000, which claims the benefit of U.S. Provisional Application No. 60/125,107, filed Mar. 19, 1999, the disclosure of each of which is expressly incorporated herein by reference in its entirety.

FIELD OF THE INVENTION

The present invention relates to the field of domain name registration. More particularly, the invention relates to an apparatus and method for forwarding a web address to a pre-existing uniform resource locator (URL).

BACKGROUND OF THE INVENTION

The World Wide Web allows for the access of information on the Internet by permitting a user to navigate Internet resources without Internet Protocol (IP) addresses or other technical knowledge. The Web does away with command-line utilities, which typically require a user to transmit sets of commands to communicate with an Internet server. Instead, the Web is made up of thousands of interconnected web sites.

In order to access a given web site, a user utilizes a uniform resource locator (URL) or domain name associated with the site. Because there are so many web sites in existence today, and because the number of web sites is always increasing, a given domain name must first be registered with a domain name registration service.

A domain name registration service is responsible for accepting a request for a domain name from an individual or a corporation and determining whether or not the domain name is already in use by somebody else. If the domain name is already taken, then the requester must choose a different domain name. If the domain name is available, then the requester is allowed to exclusively use the name and have it registered and stored in a database that maintains all of the domain names currently registered with that domain name registration service.

Domain name registration services are a great convenience in that they allow individuals and corporations to exclusively use domain names without having to create the actual web site behind the domain name or to have any web presence at all. On the other hand, this does not make it easy for many of those who already have an existing web site to associate a new domain name with the web site. Most individuals and corporations in this group have web sites that are hosted by their Internet Service Provider (ISP) and are provided free of charge. These ISPs do not usually maintain domain name service (DNS) records for their customers and do not want to maintain virtual hypertext transfer protocol (HTTP) servers because the web sites they are providing are free and doing so would be costly and cumbersome. So, any time such an individual or corporation wants a new domain name associated with a web site, a new web site needs to be created.

Furthermore, the web sites that are hosted by ISPs or free hosting companies often have domain names or URLs that are lengthy and difficult to remember. An individual or corporation that has a web site with a difficult to remember domain name would likely want an easily remembered name associated with that site so that more users will visit the site. Even if the present domain name is not difficult to remember, an individual or corporation might want to try to find a way to get more users to visit a web site without going through the trouble of actually setting up a new site. For example, some domain names attract the interest of users more easily than others, although all of the names may be equally difficult or easy to remember. Accordingly, there is presently a need for a system and method for forwarding an individual's or corporation's newly registered or previously registered domain names to an existing web site of that individual or corporation.

SUMMARY OF THE INVENTION

A method consistent with the present invention provides for forwarding a web address to another web address in a network. The method includes the steps of: receiving a request destined to a first web address including at least a domain name; determining a forwarding uniform resource locator (URL) that corresponds to the domain name; and redirecting the request to a second web address that corresponds to the forwarding URL.

An apparatus consistent with the present invention provides for forwarding a web address to another web address. The apparatus includes: a memory having program instructions; and a processor responsive to the program instructions for receiving a request destined to a first web address including at least a domain name, determining a forwarding uniform resource locator (URL) that corresponds to the domain name, and for redirecting the request to a second web address that corresponds to the forwarding URL.

Another apparatus consistent with the present invention provides for forwarding a web address to another web address. The apparatus includes: a host computer operable to receive a request destined to a first web address including at least a domain name, search a data file for a forwarding uniform resource locator (URL) that corresponds to the domain name, and redirect the request to a second web address that corresponds to the forwarding URL; a customer database storing forwarding information; and a data generator operable to extract forwarding information from the customer database and store the forwarding information in the data file.

BRIEF DESCRIPTION OF THE DRAWINGS

The accompanying drawings are incorporated in and constitute a part of this specification and, together with the description, explain the advantages and principles of the invention. In the drawings.

DETAILED DESCRIPTION

The following detailed description of the invention refers to the accompanying drawings. While the description includes exemplary embodiments, other embodiments are possible, and changes may be made to the embodiments described without departing from the spirit and scope of the invention. The following detailed description does not limit the invention. Instead, the scope of the invention is defined by the appended claims and their equivalents.

The web forwarding apparatus and method of the present invention provides the capability to forward a web address hosted by a domain name registration service to a preexisting URL. For example, suppose that a customer has a domain "my-domain.com" hosted by the domain name registration service and an existing web page with a URL of http://www.aol.com/users/dc/-don.html. The present invention can forward the web address of www.my-domain.com to the URL http://www.aol.com/users/dc/-don.html. The present invention can forward the web address of www.my-domain.com to the URL http://www.aol.com/users/dc/~don.html.

Figure 1:
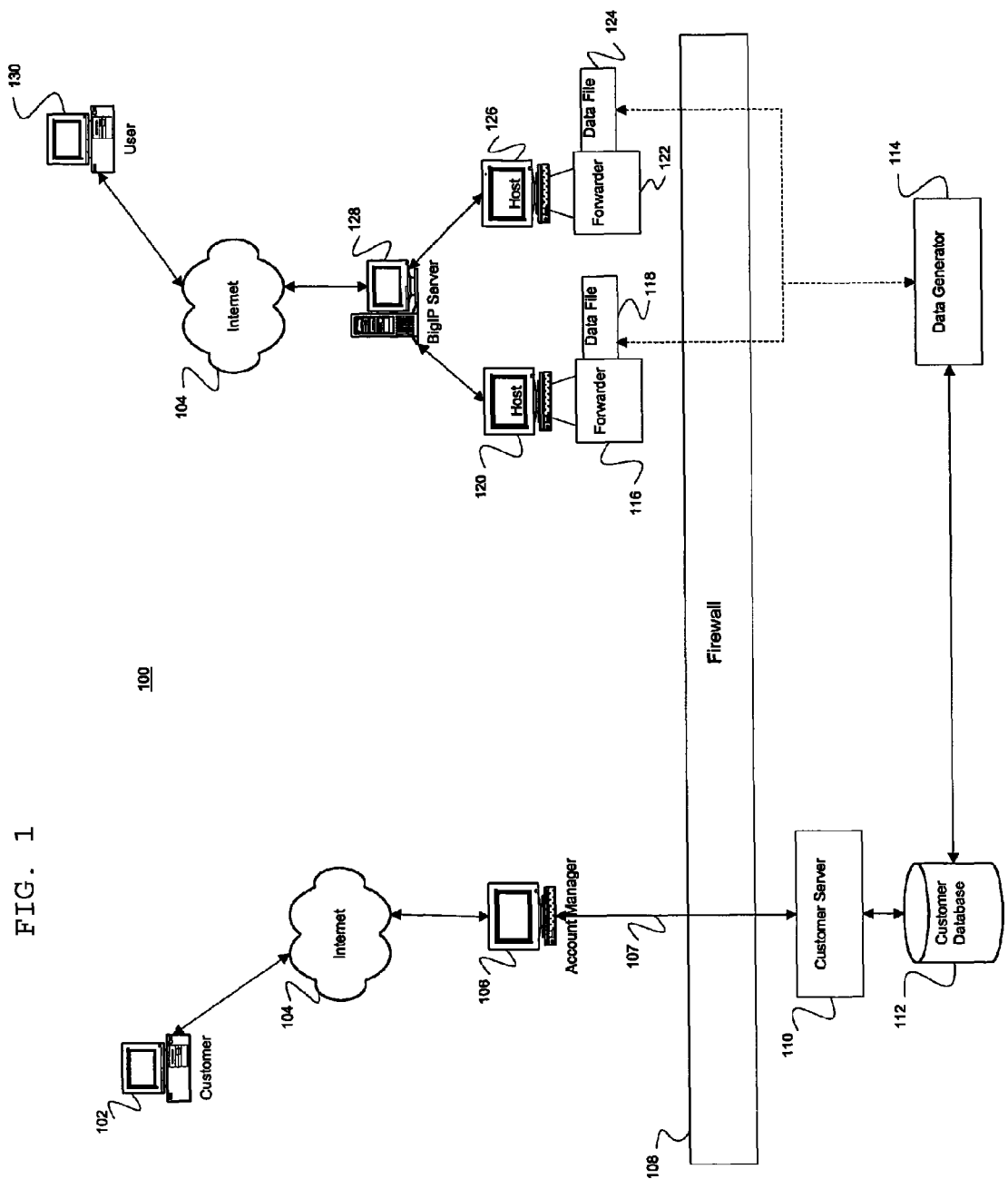
FIG. 1 is a diagram of an exemplary network environment in which a technique consistent with the present invention may be implemented.

FIG. 1 is a diagram of an exemplary network environment 100 in which methods consistent with the present invention may be implemented. Customer 102 is an individual or corporation that may want to register a domain name with a domain name registration service. Customer 102 can access the domain name registration service through the service's account manager 106, which can be reached via Internet 104. Account manager 106 hosts the service's web page and is utilized by the customer to purchase or manage the various options that are associated with a domain name registration service account. For example, using the various web pages available on account manager 106, customer 102 could sign up for an account, reserve a domain name, buy the web forwarding option, configure the web forwarding option (e.g., determine where given web address will forward), buy a mailbox at the service, contact a customer service representative, etc. Account manager 106 can be implemented, for example, using a SunServer machine available from Sun Microsystems. Account manager 106 also runs web server software, such as Stronghold. The web server software is able to communicate with an account manager program that is also resident on account manager 106 using a protocol, such as Java servlet. The account manager program is the actual program that is responsible for managing the aforementioned customer options.

Account manager 106 uses line 107 to communicate with customer server 110 through firewall 108. Data transferred on line 107 between account manager 106 and customer server 110 may be transferred according to the Visibroker Common Object Broker Architecture (COBRA) protocol created by Visigenic. Customer server 110 receives customer data from account manager 106, processes this data, and stores this data in customer database 112, if need be. For example, customer server 110 can receive data indicative of a customer buying or configuring the web forwarding option. Assuming that no errors occur in the processing of the data, the data can then be stored in customer database 112. In addition to data relevant to the web forwarding option, customer server 110 receives and processes customer data corresponding to the initial registration of a domain name by a customer, as well as data corresponding to the other options available at account manager 106. In one embodiment, customer server 110 may be implemented using a SunServer machine available from Sun Microsystems. Customer server 110 also may utilize the Solaris operating system (e.g., Solaris 2.5.1 or 2.6).

Customer database 112 stores customer data that corresponds to the accounts of each customer of the domain name registration service. This data may be stored in the form of one or more tables. For example, there could be a table storing data relevant to the web forwarding option for each customer that has purchased the option. There could also be a table storing data relevant to the registration of a domain name for each customer. In the same manner, other tables that correspond to other account options available to a customer may be maintained in customer database 112. In one embodiment, customer database 112 may be an Oracle database that uses Oracle 8.0 database management system. Oracle 8.0 can also be used as the communication protocol between customer server 110 and customer database 112. In the embodiment shown in FIG. 1, customer server 110 and customer database 112 are shown to be separate machines. Alternatively, customer server 110 and customer database 112 could be implemented on the same machine.

Data generator 114 periodically extracts data that corresponds to the web forwarding option from customer database 112 so that the web forwarding operation of the present invention can remain up to date. For example, data generator 114 could daily extract forwarding information, such as a forwarding URL and a related domain name (the forwarding URL is the location that is accessed when the related domain name is entered), and transfer that information to a data file that is accessible by a program responsible for initiating the web forwarding. Note that data generator 114 could extract the data more or less frequently than daily. Data transfer between customer database 112 and data generator 114 may occur over a Java Database Connection (JBDC). Data generator 114 may be implemented, for example, using a Sunsparc Ultra 2 machine available from Sun Microsystems, which includes a disk with at least 100 megabytes of free space. Data generator 114 may use an operating system such as Solaris 2.5.1 or 2.6, software such as JDK version 1.1.15 (or higher), Oracle database package, and Perl 5.003 or greater, and should be ssh and rsync ready.

Alternatively, forwarder 116 may be directly coupled to and retrieve data from customer database 112 without the need for a separate data generator 114. In that case, forwarder 116 may either extract forwarding URLs from customer database 112 as needed (e.g., each time a forwarding URL is requested) or perform periodic extractions from customer database 112 to a data file (e.g., data file 118) in a manner similar to data generator 114.

After extracting data from customer database 112, data generator 114 transfers the data to both data file 118 and data file 124 by invoking, for example, a rsync (remote synchronization) command. Data file 118 and data file 124 are data files that are accessible by forwarder 116 and forwarder 122, respectively, and are resident on host 120 and host 126, respectively. Data files 118, 124 store the forwarding information that corresponds to each customer of the domain name registration service that has bought and configured web forwarding for a given domain name.

Forwarders 116, 122 are executable program files that are located on host 120 and host 126, respectively. These programs receive at least a domain name from a user, search a respective data file 118 or 124 for an entry that corresponds to the domain name, and redirect the user to any location that corresponds to the entry. In one embodiment, forwarders 116, 122 are written in C as a common gateway interface (CGI) program.

User 130 may include, for example, a personal computer, which receives from a web surfer a web address that is hosted by the domain name registration service that maintains customer database 112. When this web address is entered, user 130 sends via Internet 104 to a DNS server a request for an Internet Protocol (IP) address that corresponds to the web address. The DNS server points user 130 to BigIP server 128 by returning the IP address of BigIP server 128. In this manner, user 130 establishes communication with BigIP server 128 through Internet 104. Once communication has been established, user 130 may transfer the web address to BigIP server 128.

BigIP server 128 directs traffic to and from hosts 120, 126. For example, a web address may be received from user 130. In turn, BigIP server 128 may send the web address to one of the hosts, where the web address is used as the basis for a search for a forwarding URL that corresponds to the web address. Essentially, BigIP server 128 balances the load between the two hosts by, for example, alternating between the hosts to which BigIP server 128 sends data. If one host is too busy, then data can be sent to another host. In this manner, bottle-necking of data can be avoided. It should be understood that the number of hosts connected to BigIP server 128 can be expanded as needed (e.g., if web traffic goes over the limit or the number of forwarding domains goes over a certain point, more hosts can be added to stop congestion). BigIP server 128 can be implemented, for example, using a SunServer machine available from Sun Microsystems.

When a host 120 or 126 receives a web address from BigIP server 128, the host invokes the forwarder 116 or 122 that is associated with that host to search for a location to forward the web address. Hosts 120, 126 are substantially the same type of machine and can be implemented with, for example, an Ultra 450 machine with Solaris 2.5.1 or 2.6, Apache 1.3.3 web server, and a local disk with at least 100 Megabytes. In one embodiment, hosts 120, 126 are capable of accepting an ssh connection from data generator 114.

Figure 2A:
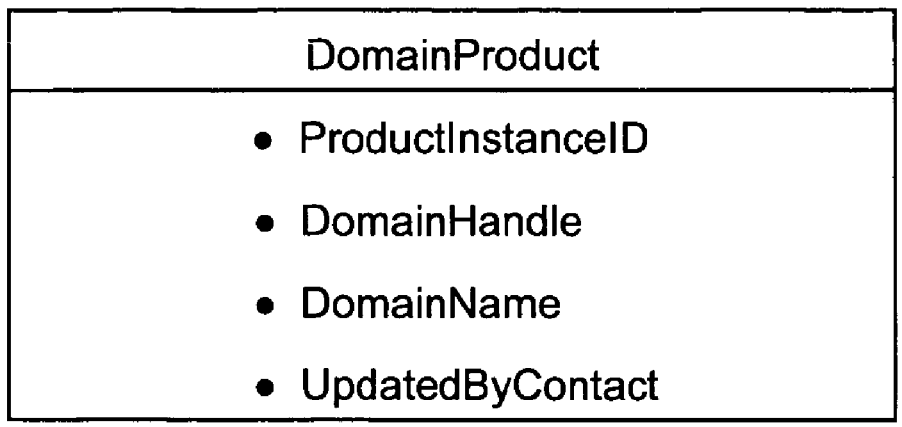
FIGS. 2A, 2B are exemplary database tables stored in a customer database consistent with the present invention.
Figure 2B:
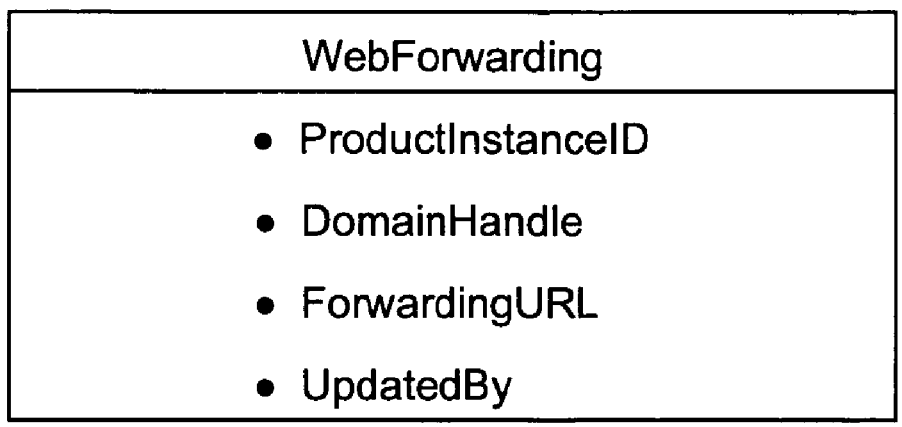

FIGS. 2A and 2B show two types of database tables that are stored in customer database 110, in accordance with one embodiment of the invention. FIG. 2A shows a database table referred to as the DomainProduct table. This table essentially provides a mapping between the database maintained by the domain name registration service (e.g., customer database 112) and a global database that hosts the master copy of domain names, including domain names not hosted by the domain name registration service that maintains customer database 112. The field entitled ProductInstanceID is a unique identification generated by the domain name registration service. Each domain name that is registered with the service has a unique identification associated with it. An example of a ProductInstanceID is WN.D.1234. The field entitled DomainHandle is a handle that is generated by the system that maintains the master copy of domain names. By associating a DomainHandle with each ProductInstanceID, the master database entry of each domain name that is registered with the domain name registration service may be tracked. An example of a DomainHandle is XYZ-DOM. The field entitled Domain Name represents the actual domain name that has been registered with the domain name registration service. An example of a Domain Name is xyz.com. The field entitled UpdatedByContact represents the handle of the contact who modified the domain.

FIG. 2B shows a database table referred to as the WebForwarding table. This table contains an entry for each domain name for which web forwarding has been purchased. The fields entitled ProductInstanceID and DomainHandle are similar to the similarly named fields in the DomainProduct table. The field entitled ForwardingURL represents a forwarding URL provided by the customer for the related domain name. The field entitled UpdatedBy represents a user identification of a user who last updated the relevant record. The WebForwarding table may also include a field indicative of a last update time.

Account Management

Figure 3:
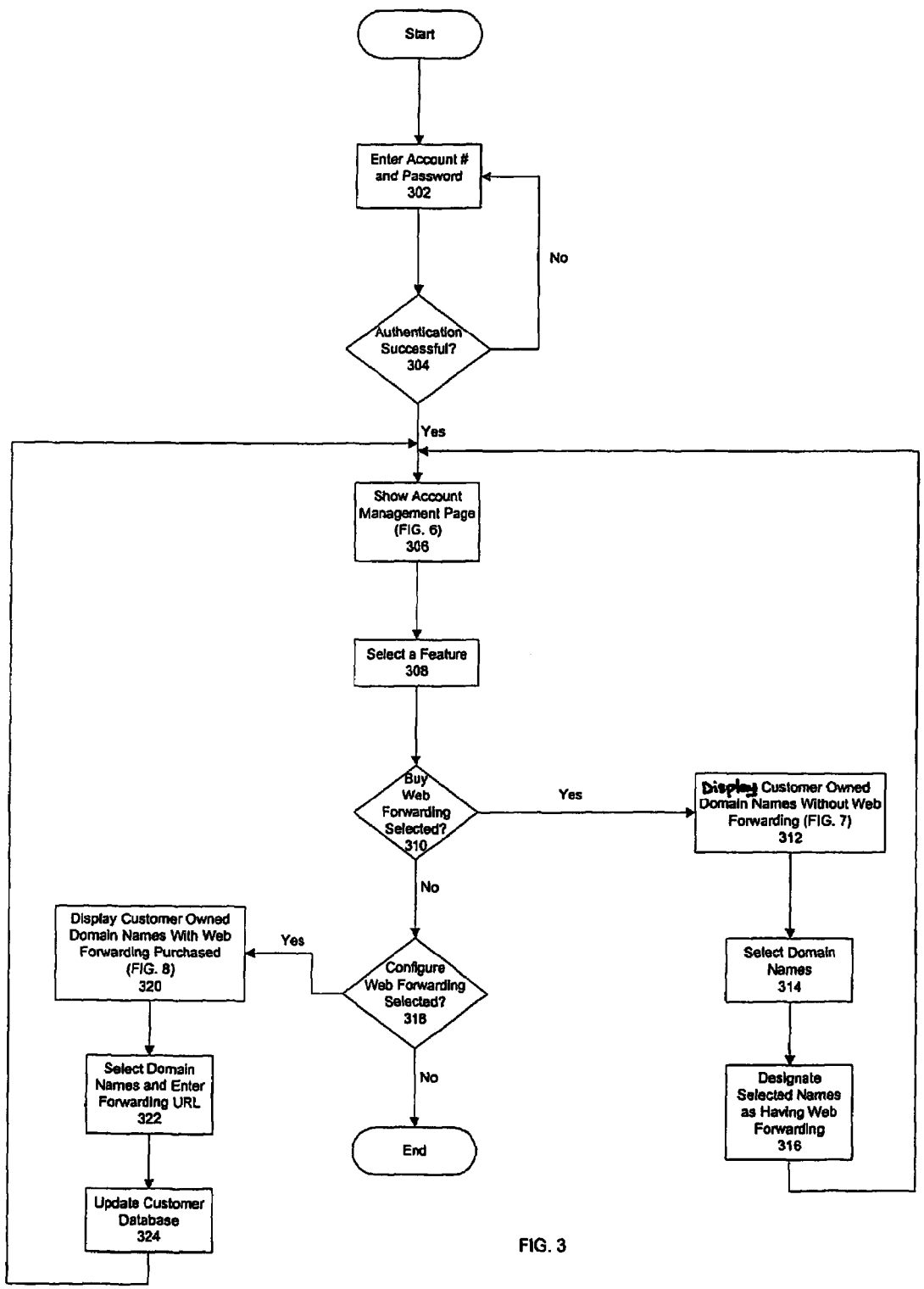
FIG. 3 is an exemplary flowchart of a process for purchasing and configuring web forwarding in a manner consistent with the present invention.

As was previously mentioned with respect to FIG. 1, a customer who desires to utilize the web forwarding option of the present invention for domain names owned by the customer can do so by purchasing and configuring web forwarding on an account management page resident on account manager 106. FIG. 3 shows a flowchart of an exemplary method for purchasing and configuring web forwarding, in accordance with one embodiment of the invention. Initially, a customer who accesses the account management page must log into the system (e.g., provide authentication) by entering an account number and password (step 302). The account manager program resident on account manager 106 then makes a determination as to whether or not the authentication by the customer was successful (step 304). If the authentication was not successful, then the customer is prompted that authentication was invalid and is given another chance to enter the relevant information.

If authentication proves to be successful, then the main account management page is displayed (step 306). This account management page may look like, for example the page shown in FIG. 6. The main account management page makes several options available to the customer. These options may include: purchasing a mailbox so that a customer can receive email that may be relevant to the customer's account; contacting the administration of the domain name registration service via email; purchasing a web forwarding option; and configuring a web forwarding option. When presented with these options, the customer may select one of them (step 308). Once an option has been selected by the customer, the account management program makes a determination as to whether the web forwarding purchasing option was selected (step 310). If that option was selected, then the customer is directed to a web page that lists all of the domain names owned by the customer and hosted by the domain name registration service (step 312). The listed domain names, however, include only those domain names for which the customer has not purchased web forwarding. Such a web page may look like, for example, the web page shown in FIG. 7. The customer may then select each of the domain names for which web forwarding is desired (step 314). It is possible to buy web forwarding for multiple domain names at once so that the customer does not have to repeatedly return to the purchase web forwarding page. After the customer has chosen which domain names are to have web forwarding, the account management program designates the chosen domain names as having web forwarding (step 316) and returns the customer to the main account management page.

If the web forwarding purchasing option was not selected by the customer, then the account management program makes a determination as to whether the configure web forwarding option was selected (step 318). If the option was not selected, then no transaction involving web forwarding is selected and normal processing of the account management program continues (e.g., determine what option besides web forwarding is selected and properly process that option). If configure web forwarding is selected by the customer, then the customer is directed to a web page that lists all of the domain names owned by the customer and hosted by the domain name registration service for which web forwarding has been purchased (step 320). By displaying all of the domain names for which web forwarding has been purchased, the customer gains access to domain names for which web forwarding has never been configured (e.g., newly purchased web forwarding) and to domain names for which web forwarding has already been configured. Such a web page may look like, for example, the web page shown in FIG. 8. Once presented with these domain names, the customer may choose which domain names are to be configured with web forwarding and provide a URL to which the given domain name is to be forwarded (step 322). Note that by using the configure web forwarding page, it is also possible for the customer to modify or delete a forwarding URL in addition to adding a forwarding URL as previously described. For example, upon accessing the configure web forwarding page, instead of adding a forwarding URL where there was none before, the customer may change an existing forwarding URL to a different one, or decide to delete an existing forwarding URL associated with the domain name. After the customer has added, modified, or deleted a forwarding URL as explained above, the account management program proceeds to update customer database 112 to reflect any new or different information (step 324). After that, the customer may be returned to the main account management page. Once the information entered by the customer is in customer database 112, data generator 114 is free to extract that information as needed.

Data Generation

Figure 4:
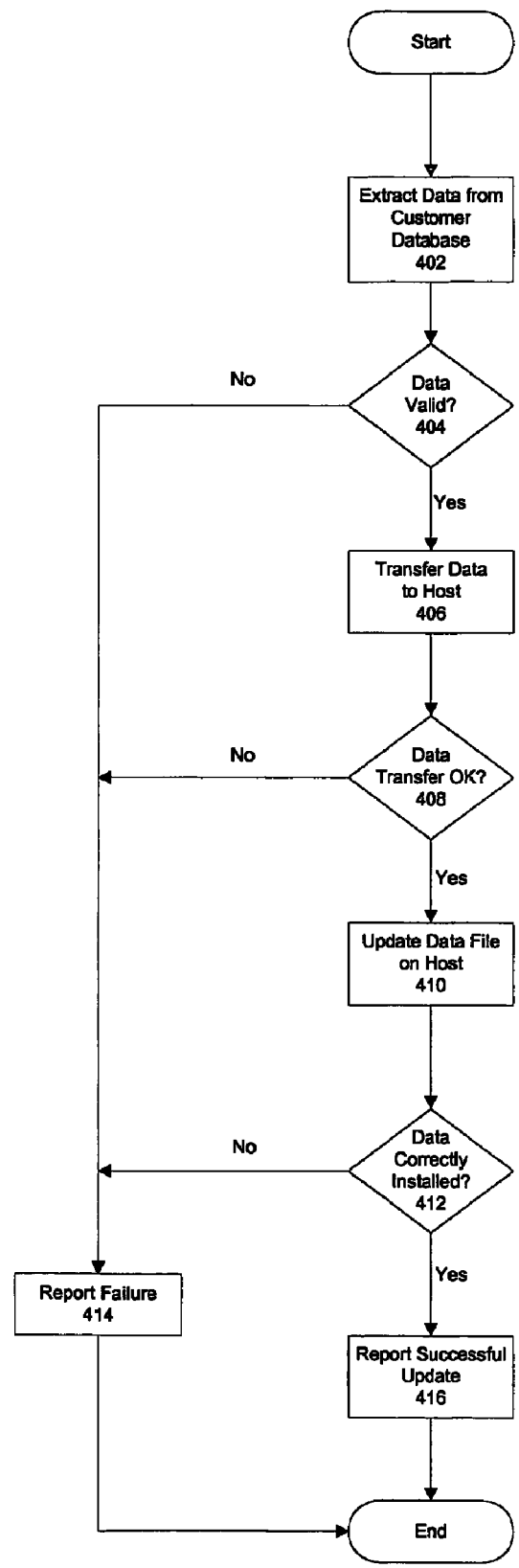
FIG. 4 is an exemplary flowchart of a process for extracting data from a customer database in a manner consistent with the present invention.

FIG. 4 shows a flowchart of a data generation method for extracting data from customer database 112 and installing it on hosts 120, 126, in accordance with one embodiment of the invention. This method is implemented by data generator 114 as a cron job (e.g., the method periodically starts at a predetermined time). For example, the method can be performed once every 24 hours. The frequency of the execution of the method can be set by the domain name registration service. Alternatively, in the event that the cron job is not executing properly, the method could be manually run at predetermined times by an employee of the domain name registration service.

As shown in FIG. 4, data generator 114 extracts web forwarding data from customer database 112 (step 402). Once the data has been extracted and sent to data generator 114, the data generator 114 makes a determination as to whether or not the data that was received is valid (step 404). If the data received by data generator 114 is not valid, then a message to that effect is sent to, for example, an employee of the domain name registration service. The employee could then attempt to identify the problem with the data extraction so that a solution could be provided.

If the data received by data generator 114 is valid, then that data may then be transferred to hosts 120, 126 (step 406). When the data is initially transferred to the host, it is stored in files reserved for new data from data generator 114 but not immediately stored in data files 118, 124. After data has been put in these files, data generator 114 makes a determination as to whether or not the transfer occurred correctly (step 408). If there is error in the transfer from data generator 114 to hosts 120, 126, then a message to that effect is sent to, for example, an employee of the domain name registration service.

If the data transfer has no error, then data files 118, 124 may be updated to reflect the new data (step 410). For example, the update may occur by deleting old backup data associated with data files 118, 124, moving the current data in data files 118, 124 into the backup position, and moving the new data into the current position. After the data files have been updated as described above, a determination is made as to whether the data was correctly installed in the data files (step 412). If the data was not correctly installed, then a message to that effect is sent (step 414) to, for example, an employee of the domain name registration service. If the data was correctly installed, then a message reporting that the update was successful is sent (step 416) to an employee of the domain name registration service. When data has been successfully installed, it is immediately available for use in web forwarding operations.

Web Forwarding

Figure 5:
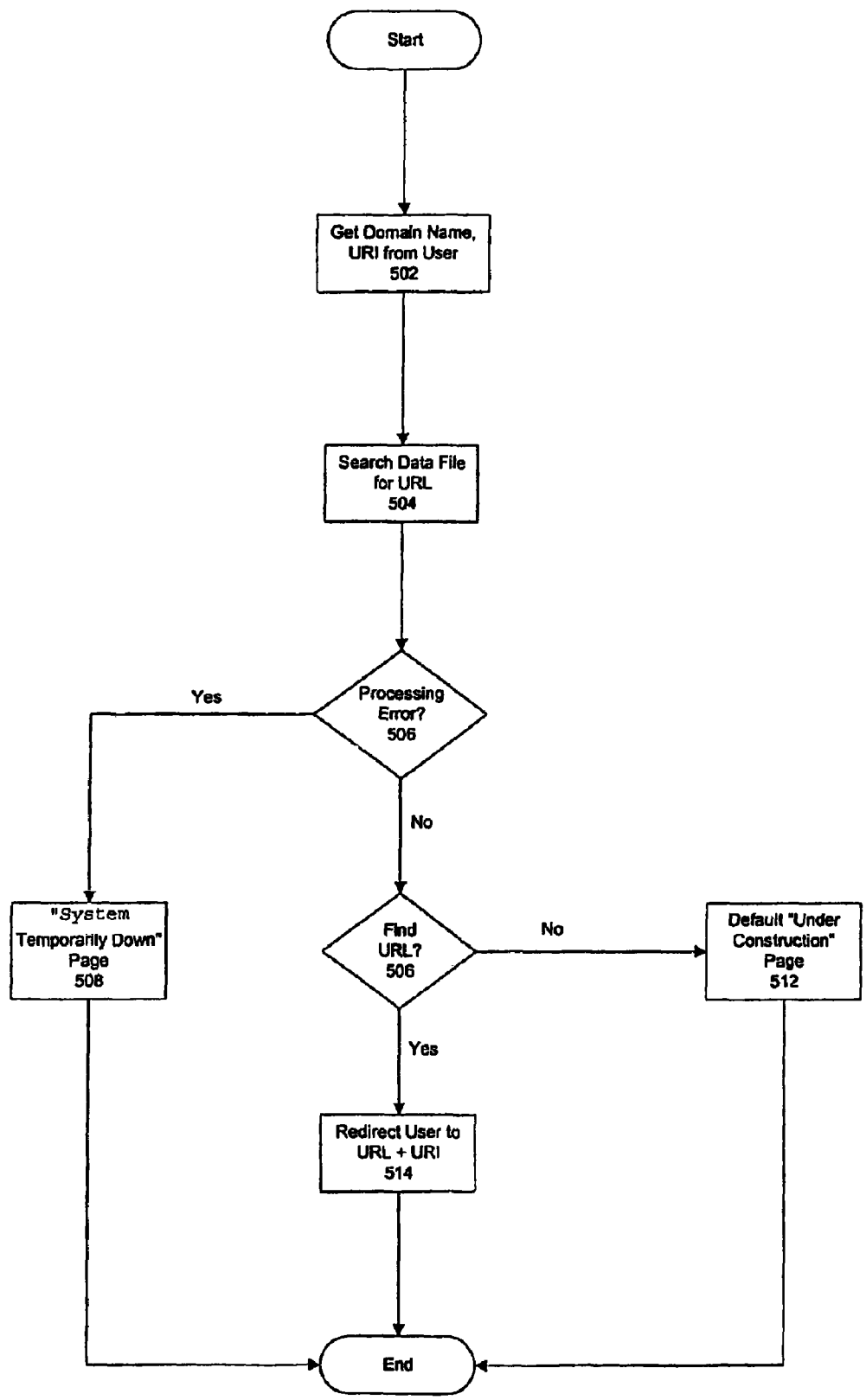
FIG. 5 is an exemplary flowchart of a process for implementing the web forwarding operation in a manner consistent with the present invention.

FIG. 5 shows a flowchart of an exemplary method for implementing the web forwarding process, in accordance with one embodiment of the invention. When user 130 enters a web address that is hosted by the domain name registration service, an http request that includes the web address is sent from the user to BigIP server 128. In turn, BigIP server 128 directs the request to one of the hosts 120 or 126 (for the purposes of this explanation, assume that host 120 has received the request). Upon receiving the request, host 120 invokes forwarder 116, which implements the method described in FIG. 5.

Using the web address that was included in the request, forwarder 116 acquires a domain name an a uniform resource identifier (URI) for that web address (step 502). For example, if user 130 types in a web address of "www.joe-domain.com/section3/user1.html", forwarder 116 uses that web address to capture a domain name of "joe-domain.com" and a URI of "/section3/use 1.html". After acquiring the relevant information, forwarder 116 uses the captured domain name as the basis for searching data file 118 for an entry that corresponds to the domain name (step 504). Specifically, forwarder 116 searches for a forwarding URL that corresponds to the captured domain name. After forwarder 116 attempts to find a forwarding URL, a determination is made as to whether or not there was a processing error (step 506). For example, a processing error may occur if for some reason the data file is missing or cannot be properly read. If a processing error has occurred, then user 130 is directed to a web page that provides an indication that the system is temporarily down. If the search proceeded without any errors, then a determination .is made as to whether or not a forwarding URL that corresponds to the entered domain name was found (step 506). If no forwarding URL was found during the search even though the search was completed without error, then user 130 is directed to a default "under construction" web page (step 512). The forwarding program (e.g., forwarder 116 or 122) may find no forwarding URL, for example, when the entered domain name is missing from the data file (e.g., data file 118 124). A missing domain name could be an indication that the data generation process has not yet finished or that it did not finish properly.

When one or more forwarding URLs were found during the search, a forwarding URL that was found as a result of the search and the previously captured URI may be used to redirect user 130 to the proper location (step 514). For example, for the previously captured domain name of "joe-domain.com" and previously captured URI of "/section3/user1.html", assume that the search produced one URL result of "www.geocities.com/members/joe". Forwarder 116 then combines the forwarding URL result with the previously captured URI to form the location of "www.geocities.com/members/joe/section3/user1.html" and redirects user 130 to this location. Forwarder 116 can cause the redirection of user 130 by, for example, sending a string that includes the location (e.g., combined URL and URI) back to user 130 using a http location command. In one embodiment, forwarder 116 or 122 may include the type of the site (e.g., the protocol to be used in accessing the resource) to which user 130 is redirected as part of the string sent back to user 130. For example, forwarder 116 can forward to an http site, a fttp site, a https site, a gopher site, a telnet site, etc. The indication of the type of site is usually included in the forwarding URL that was originally supplied by customer 102. In a situation where an indication of the type of site is not included in the forwarding URL and hence not included in the string sent back to user 130, forwarder 116 may redirect user 130 to an http site. Note that after the user is redirected to the new location, the web address of that location appears in the location field of the user's web browser.

Sample Web Pages

Figure 6:
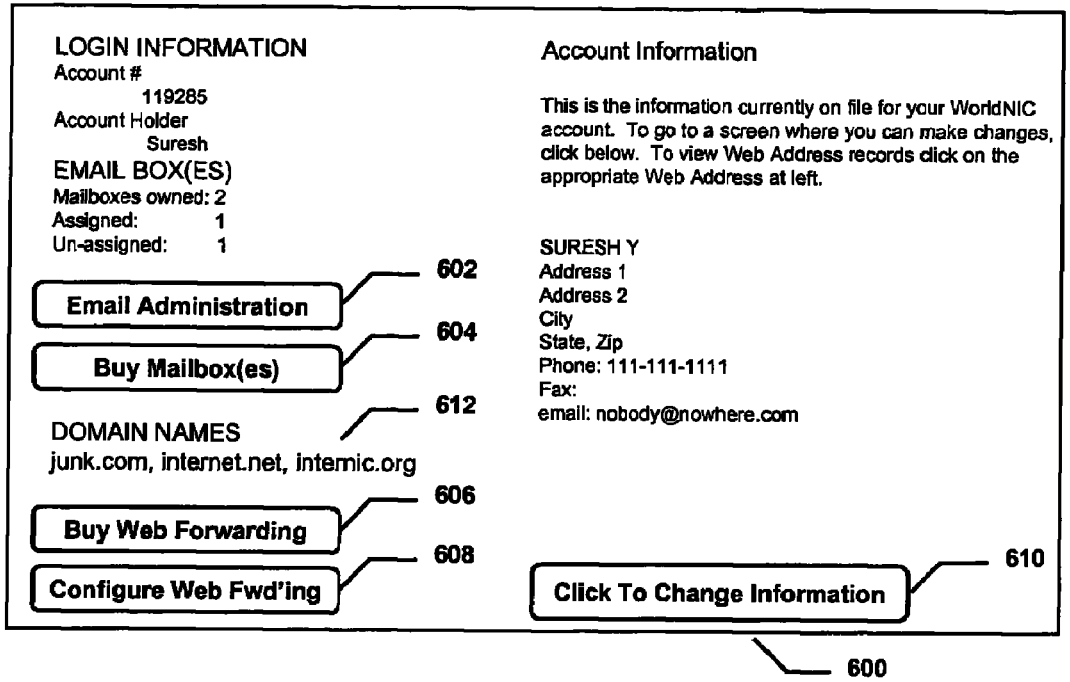
FIG. 6 is an exemplary main account management web page consistent with the present invention.

FIG. 6 shows an exemplary main account management web page 600. A customer utilizes this web page to purchase and manage various options or features that are available to an owner of a domain name hosted by the domain name registration service. Main account management web page 600 is generally accessed after a customer has properly logged into the account management program. This page includes general information concerning the customer along with several buttons with associated account options. The information included on this page may include: information indicative of the customer account number and customer name; information related to any email boxes that might be owned by the customer; information indicating what domain names (e.g., domain names hosted by this domain name registration service) are owned by the customer; and information related to the account holder (e.g., address, phone number, email, etc.). Button 602 may be selected by a customer with a mouse, for example, to contact an administrator of the domain name registration service. A customer that encounters some problems using the system may want to use this button. Button 604 may be selected by the customer to purchase email boxes that are available from the domain name registration service. Button 606 may be selected by the customer to purchase the web forwarding option for one or more domain names. Selection of this button results in the customer being directed to the purchase web forwarding page. Button 608 may be selected by the customer to configure the web forwarding option for those domain names for which the option has been purchased. Selection of this button results in the customer being directed to the web forwarding configuration page. Button 610 may be selected by the customer to change the account information currently on file for a particular customer. For example, this button could be selected when a customer needs to change address information or the like. Selection of this button results in the customer being directed to a web page where the appropriate changes can be made. Note that records concerning a particular domain names may be accessed by the customer clicking on one of domain names 612.

Figure 7:
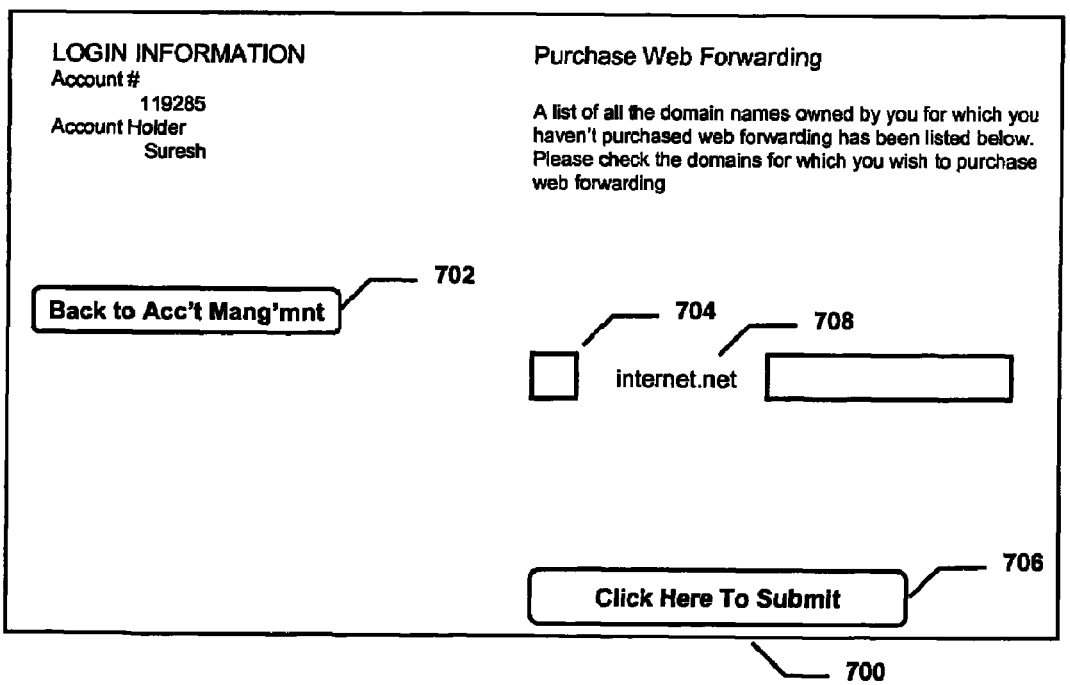
FIG. 7 is an exemplary web page for purchasing web forwarding consistent with the present invention.

FIG. 7 shows an exemplary purchase web forwarding web page 700. Once a customer has selected button 606, the customer is directed to this web page. Purchase web forwarding web page 700 includes a list 708 of all of the domain names (e.g., domain names hosted by the domain name registration service) owned by the customer for which web forwarding has not been purchased. Box 704 may be selected by the customer to indicate that web forwarding should be purchased for the domain name associated with box 704 (e.g., internet.net in FIG. 7). After selecting one or more domain names for which the web forwarding option should be purchased, the customer may select button 706 to submit the selection to the account management program. Button 702 may be selected by the customer at any time in order to return to main account management page 600.

Figure 8:
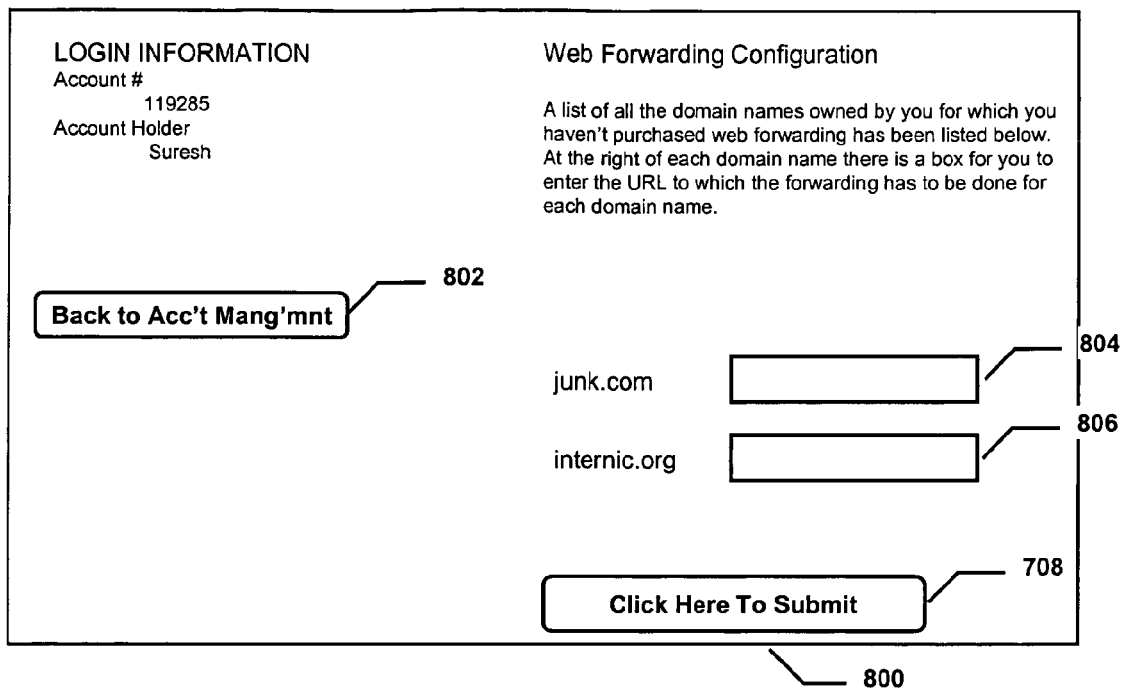
FIG. 8 is an exemplary web forwarding configuration web page consistent with the present invention.

FIG. 8 shows an exemplary web forwarding configuration web page 800. Once a customer has selected button 608, the customer is directed to this page. Web forwarding configuration web page 800 includes a list 810 of all of the domain names (e.g., domain names hosted by the domain name registration service) owned by the customer for which web forwarding has been purchased. This list may include any domain names that have already been configured for web forwarding as well as domain names that have not been configured for web forwarding. The customer can use boxes 804 or 806 to enter a forwarding URL associated with a given domain name. After selecting one or more domain names for which the web forwarding option should be configured, the customer may select button 808 to submit the selection to the account management program. Button 802 may be selected by the customer at any time in order to return to main account management page 600.

While the present invention has been described in connection with a preferred embodiment, many modifications will be readily apparent to those skilled in the art, and this application is intended to cover any adaptations or variations thereof. One skilled in the art will appreciate that all or part of the systems and methods consistent with the present invention may be stored on or read from computer-readable media, such as secondary storage devices, like hard disks, floppy disks, and CD-ROM; a carrier wave received from a network such as the Internet; or other forms of ROM or RAM. This invention should be limited only by the claims and equivalents thereof.

What is claimed is:

1. A method for managing domain names, comprising:
storing a plurality of user accounts in a computer-readable data store, each of the plurality of user accounts being associated with a plurality of domain names belonging to the user;
storing a plurality of forwarding address records in the data store, each forwarding address record indicating a forwarding address for one of the plurality of domain names;
electronically receiving account information from a customer;
authenticating the customer as an owner of one of the plurality of user accounts;
presenting the list of domain names associated with the customer's user account, the domain names being owned by the customer;
receiving, from the customer, a selection of one of the plurality of domain names;
receiving, from the customer, a specification of a forwarding address to which the selected domain name is to be forwarded;
updating the data store to associate the selected domain name with the forwarding address;
receiving, from a user other than the customer, a request for a requested web address, the requested web address including the selected domain name;
retrieving the specified forwarding address from the data store based on at least a portion of the requested web address; and
forwarding the request to the specified forwarding address.

2. The method of claim 1, wherein the forwarding address comprises a domain name and a uniform resource indicator (URI).

3. The method of claim 1, wherein the forwarding address consists of a domain name.

4. The method of claim 1, wherein the requested web address comprises the selected domain name and a uniform resource indicator (URI).

5. The method of claim 1, further comprising periodically updating a remote host with the forwarding address specified by the customer.

6. A method for managing a plurality of domain names owned by a user, the method comprising:
electronically presenting a list of domain names owned by the user;
receiving, from the user, a selection of one of the domain names;
receiving, from the user, a first uniform resource locator (URL) to which the selected domain name is to be forwarded in response to a request from any of a plurality of users, the plurality of users including at least one user that is not the owner of the selected domain name; and
modifying a customer database to associate the first URL with the selected domain name.

7. The method of claim 6, further comprising:
receiving a request including a second URL, the second URL comprising the selected domain name;
retrieving the first URL from the database;
constructing a third URL based on the first URL; and
forwarding the request to the to the third URL.

8. The method of claim 6 wherein the first URL is a domain name.

9. The method of claim 6 wherein the first URL comprises a domain name and a URI.

10. The method of claim 6, further comprising:
receiving, from a second user, a request for a requested web address, the requested web address including the selected domain name;
retrieving the first URL to which the selected domain name is to be forwarded based on at least a portion of the requested web address from the customer database; and
forwarding the request to the first URL.

11. The method of claim 10, further comprising:
receiving, from a third user different from the second user, a request for a second requested web address, the second requested web address including the selected domain name;
retrieving the first URL to which the selected domain name is to be forwarded based on at least a portion of the second requested web address from the customer database; and
forwarding the request to the first URL.

12. A system comprising:
a customer server comprising a processor and configured to communicate with at least one customer over a network;
a customer database in communication with the customer server, the customer database comprising a processor and storing:
a plurality of customer records associating customers with domain names owned by the respective customers; and
a plurality of forwarding address records, each forwarding address record associating a domain name owned by a customer with a forwarding address specified by the customer to which a request from a user other than the customer that includes the associated domain name should be forwarded; and
a data generator to update domain name data stored on at least one host based on the forwarding address records stored by the customer database.

13. The system of claim 12, wherein each of the forwarding addresses listed in the forwarding address records is specified by a customer that owns the domain name associated with the forwarding address.

* * * * *